(12) United States Patent
Broberg

(10) Patent No.: US 6,761,414 B1
(45) Date of Patent: Jul. 13, 2004

(54) TOP HINGED GRAVITY, FLOATING AND POWER SELF-OPENING GATE FOR DUMP BODY

(75) Inventor: David L. Broberg, Broomfield, CO (US)

(73) Assignee: Ranch Manufacturing Company, Lamar, CO (US)

(*) Notice: Subject to any disclaimer, the term of this patent is extended or adjusted under 35 U.S.C. 154(b) by 0 days.

(21) Appl. No.: 10/341,089

(22) Filed: Jan. 13, 2003

(51) Int. Cl.[7] .......................... B60P 1/26; B62D 33/027
(52) U.S. Cl. ...................... 298/23 R; 296/56
(58) Field of Search .................. 298/23 MD, 17 R, 298/23 R, 23 M, 23 S, 22 D, 22 A, 23 D; 296/50, 51, 56, 146.1, 147, 146.4, 146.8, 146.9, 146.11, 146.12

(56) References Cited

U.S. PATENT DOCUMENTS

| | | | |
|---|---|---|---|
| 2,212,058 A | * | 8/1940 | Wood ...................... 414/525.5 |
| 3,830,542 A | * | 8/1974 | Lablance .................... 296/56 |
| 3,860,288 A | * | 1/1975 | Martin et al. ........... 298/23 MD |
| 4,468,065 A | * | 8/1984 | Taniguchi ................. 298/23 R |
| 5,143,496 A | * | 9/1992 | Smith et al. .................. 410/68 |
| 5,288,137 A | * | 2/1994 | Henry .................... 298/23 DF |
| 5,498,067 A | * | 3/1996 | Christenson .......... 298/23 MD |
| 5,527,098 A | * | 6/1996 | McKinney et al. .... 298/23 MD |
| 2002/0005650 A1 | * | 1/2002 | Rogers et al. ................. 296/56 |

FOREIGN PATENT DOCUMENTS

| | | | | |
|---|---|---|---|---|
| JP | 359006142 A | * | 1/1984 | ............... 298/23 R |
| JP | 359081237 A | * | 5/1984 | ............... 298/23 R |
| JP | 360008165 A | * | 1/1985 | .................. 296/50 |
| JP | 361119442 A | * | 6/1986 | ............... 298/23 D |

* cited by examiner

Primary Examiner—D. Glenn Dayoan
Assistant Examiner—Hilary Gutman
(74) Attorney, Agent, or Firm—Connolly Bove Lodge & Hutz LLP

(57) ABSTRACT

A top hinged gate assembly includes a hinge arm mounted to a gate and pivotally mounted to a first pivot structure. The first pivot structure is located above and forward of the gate. A gravity release lever is pivotally mounted to the first pivot structure and carries a second pivot structure. A variable length power actuator is mounted to the gate and to the second pivot structure.

17 Claims, 4 Drawing Sheets

TOP HINGED GRAVITY, FLOATING AND POWER SELF-OPENING GATE FOR DUMP BODY

FIELD OF INVENTION

This invention relates to a new method of power opening a top hinged gravity closing and floating opening gate on a dump body mounted on a truck, semi-trailer or full-trailer chassis.

BACKGROUND OF THE INVENTION

Dump bodies mounted on truck or trailer chassis are used to carry bulk flowable granular or chunk material such as dirt, crushed rock, hot asphalt paving, wet concrete, building or highway demolition debris, etc. from one location to another. The material is normally loaded into the dump body by self-powered machines such as tracked excavators, wheel loaders, backhoes, or from an overhead loading device such as a conveyor, chute or bottom discharge storage bin. The material is constrained within the body by the body floor and sides, a front bulkhead and a rear top hinged gate. The top of the body is open during loading and sometimes during unloading, but it is closed during transportation to the dump site. Normally the end dump body discharges its load into a pile or onto a conveyor mechanism which then moves the material way from the dump body. The method used to discharge the material from the dump body is to position the rear of the body containing the gate at the location of desired discharge, unlock the bottom latch of the top hinged gate so it is free to open from either the contents pressing against it or by gravity as the rear hinged body is rotated. The front of the body is raised until the floor of the body is tilted steeply enough that the contents of the body slide rearward and downward against the unlatched hinged gate which then opens as required from the pressure of the sliding contents and allows the contents to slide out of the body onto the ground or conveyor stem.

When the discharge is complete, the end dump body is pulled clear of the discharged contents pile during which the gate is free to ride over or float over the pile until it clears the pile. About the same time as the body is pulled clear of the pile, the dump body is lowered to its horizontal position, the gate closes by gravity because the hinge is located forward of the gate, the latch is locked and the truck is driven to the next loading site to start the cycle over.

Under certain circumstances it is desirable to have a powered mechanism open the gate to approximately parallel to the body floor before the body is rotated into its steep dump angle. This occurs for example when the rear of the body gets so close to the discharge surface before the contents start to slide out that the hinged gate will not clear or is driven into the discharge surface. In this case, the load discharge will be impeded by the gate which can result in damage to the gate. Another scenario occurs when the contents are large and heavy, such as large boulders, that when they start sliding or tumbling rearward and downward against the gate, the gate may be damaged or destroyed by impact before it can be forced open. At the present time, this need to open the gate to approximately its maximum discharge opening which occurs at the point where the gate face aligns with the body floor, is accomplished by a body mounted air, hydraulic or electric powered actuator lift mechanism which lifts the gate hinge arms until the gate face is parallel to the body floor. This power hinge lift mechanism is activated manually after the gate latch is unlocked or automatically by a delayed action valve that first unlocks the latch then powers the gate open and the reverse when the gate is lowered and then latched. Since the gate must be free to open further than the power actuator lifts it as it rides over the discharge pile, the gate powered lift mechanism is not connected directly to the hinge arms, but merely lifts the hinge arm via a protrusion on the hinge arm. The lift arm hinges about the same hinge center as the gate hinge so that it follows the gate as it hinges under power. These gate lift arm power actuators are located forward of the gate along the sides of the dump body in either a horizontal or vertical position. Since the dump bodies are primarily loaded from the side by large machines, the side mounted cylinders are very vulnerable to damage from both the loading vehicle and from the loaded material which frequently tumbles onto the top of the body side during loading and dumping. The typical solution for this vulnerability is to fasten heavy guards around the actuators or to locate the actuators within the body rear structural frame. Both of these guarded locations work satisfactorily, but because maximizing the cubic volume of the body is always an important objective with dump bodies, and since the overall width of a truck or trailer body is restricted by state and federal regulations, the power actuators are restricted to small cross section which limits the force they can exert and since the work they can do is defined by force times distance, they require a long stroke to have enough power to lift the weight of the gate. This long stroke require a long heavy guard to protect each actuator. If the gate is very large and heavy, it is not possible to fit a large enough actuator to lift the gate. Another problem that occurs is that the actuator and its guard and the lift mechanism usually extends the full legal width of the trailer in order to maximize the dump body width but most states have enacted load covering regulations to prevent the air from aspirating solid particles out to the body during highway transport which results in damage to other vehicles close to the end dump body. These load covering devices also require a mechanism that is outside of the body overall width to function properly. This means that they have to be wider than the guards over the gate hinge power actuators and the lift mechanism or must stop covering the load at some distance from the gate and a secondary covering device installed inside the body to cover this gap. This increases complexity, cost and time to manipulate during each load transport cycle.

Another problem is that at the rear of the dump body, a strong frame is required to prevent the body from spreading from the outward pressure of the load piled against the side of the discharge opening. This frame is usually the widest part of the body structure and accordingly there is no room for a powered lift mechanism outside of this frame and so the lift mechanism must be forward of this frame and thus so must the gate hinge. The more forward the gate hinge, the more power it takes to open and the greater the force exerted on the gate and hinge by the sculpting of the pile as the gate is dragged across it. Since the required lift forces get very large as the gate hinge moves forward, the gate and hinge must be built very robust and thus becomes heavy which exacerbates the limited power available from the size restricted body mounted actuators and lift mechanism.

SUMMARY OF THE INVENTION

An object of this invention is to provide a top hinged gravity, floating and power self-opening gate for a dump body which fulfils the above needs.

A further object of this invention is to provide a gate which can easily be operated and is effective in its operation.

In accordance with this invention the top-hinged gravity and floating opening gate assembly includes a gate for selectively opening and closing the discharge opening of a dump body. At least one hinge arm is mounted to the gate. The hinge arm is pivotally mounted to a first pivot structure located above and forward of the gate. A gravity release lever is pivotally mounted to the first pivot structure. A variable length power actuator such as a piston/cylinder assembly is mounted to the gate. A second pivot structure displaced from the first pivot structure is secured to the gravity release lever. A linkage assembly may be connected to the variable length power actuator and be pivotally mounted to the second pivot structure. When the actuator is increased in its length the gate rotates from its closed position to an open position which would be generally perpendicular to the closed position and parallel to the floor of the dump body. The gravity release lever permits the gate to rotate beyond that open position in response to an object contacting the gate.

In a preferred practice of this invention each side of the gate is provided with a hinge arm and with a gravity release lever with the associated pivot structures. Each side may be provided with its own variable length power actuator or a single variable length power actuator may be used for powering both sides.

The variable length power actuator may be connected to the second pivot structure by a linkage assembly which may include a crank arm pivotally connected to the actuator with the crank arm being rigidly secured to a connector arm which in turn is pivotally connected to a connector link pivotally mounted to the second pivot structure.

THE DRAWINGS

DETAILED DESCRIPTION

Figure 1:
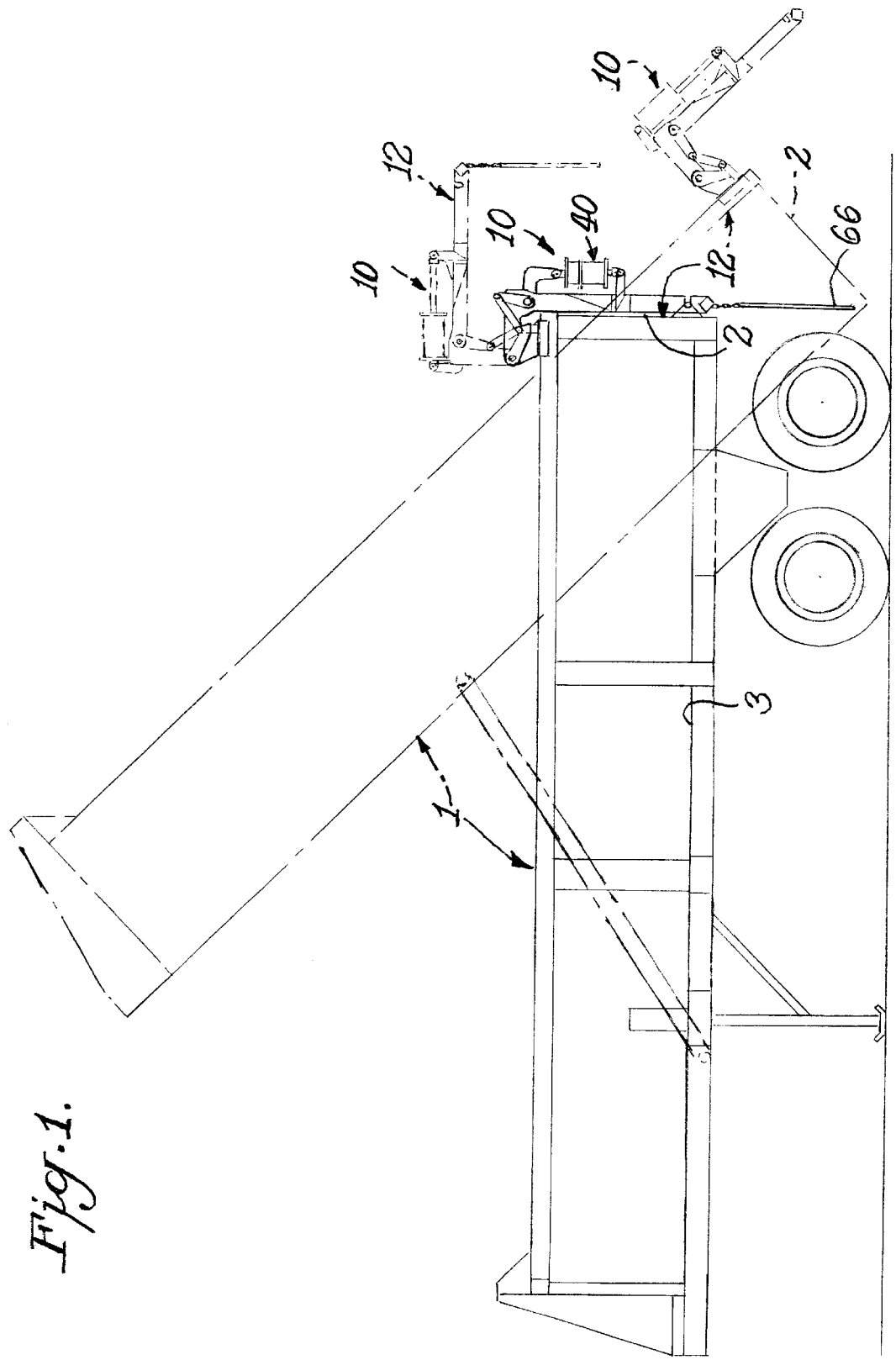
FIG. 1 is a side elevational view of a dump body of a vehicle having the top hinged gate assembly of this invention.

The present invention relates to a gate assembly which is preferably used on the dump body mounted to a vehicle such as a truck, semi-trailer or full trailer chassis. FIG. 1, for example, shows a suitable dump body 1 which is shown in solid lines in the normal horizontal condition. FIG. 1 also shows the dump body 1 in phantom when it is in its elevated or dumping condition. FIG. 1 also illustrates a top hinged gate assembly 10 in accordance with this invention. As shown in solid lines the gate assembly is in its closed position where it closes the discharge opening 2 at the end of body 1 FIG. 1 also illustrates in phantom the assembly 10 in its fully open position where the gate 12 is horizontal, parallel to the floor 3 of the body 1 when the-body is in its normal horizontal position. Finally, FIG. 1 shows the assembly 10 in an inclined, but fully open position as shown in phantom when the body 1 is elevated to the inclined position.

Figure 2:
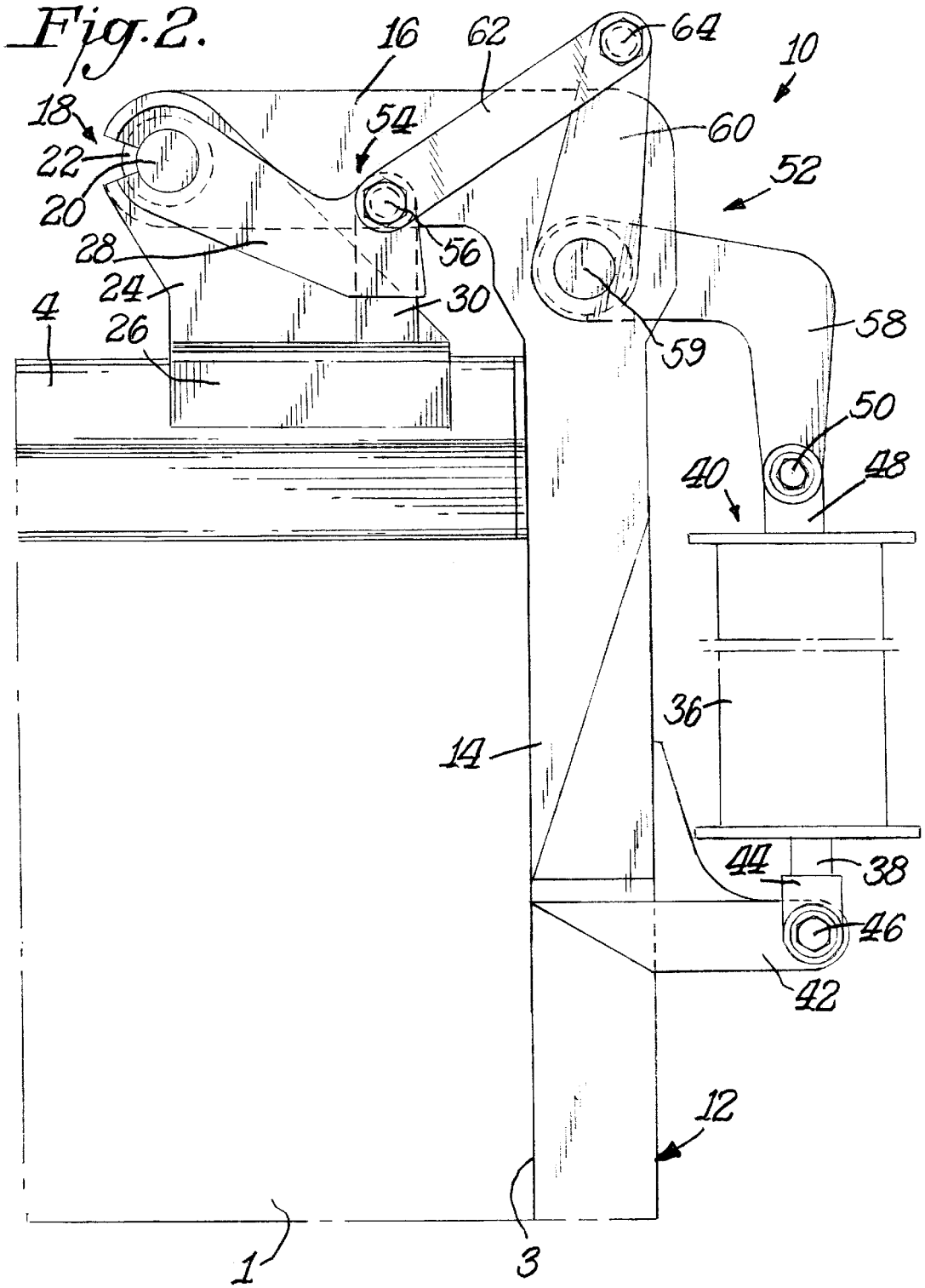
FIG. 2 is a fragmental side elevational view of the gate assembly shown in FIG. 1 in the closed condition.
Figure 3:
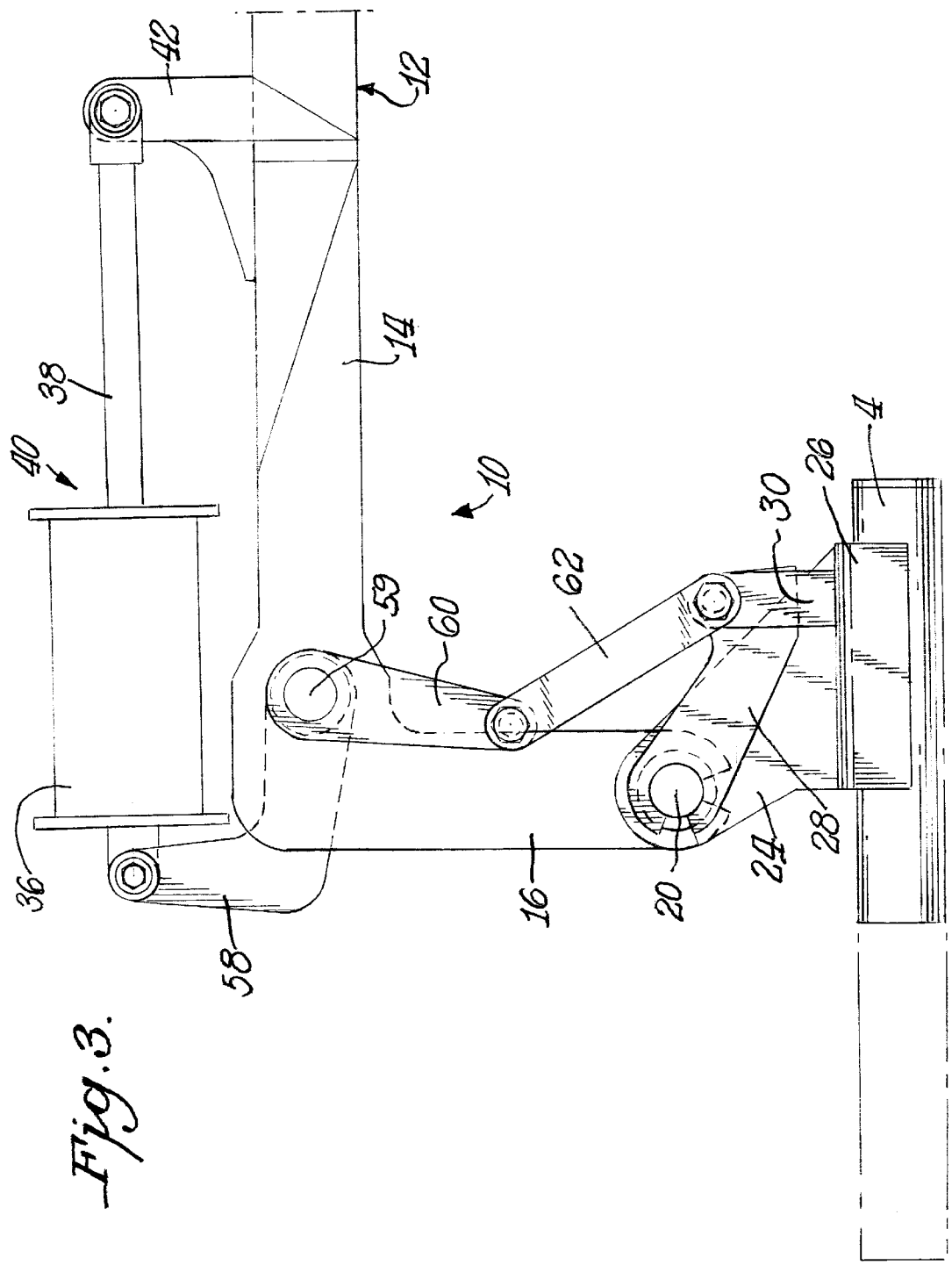
FIG. 3 is a view similar to FIG. 2 with the gate assembly in the open condition.
Figure 4:
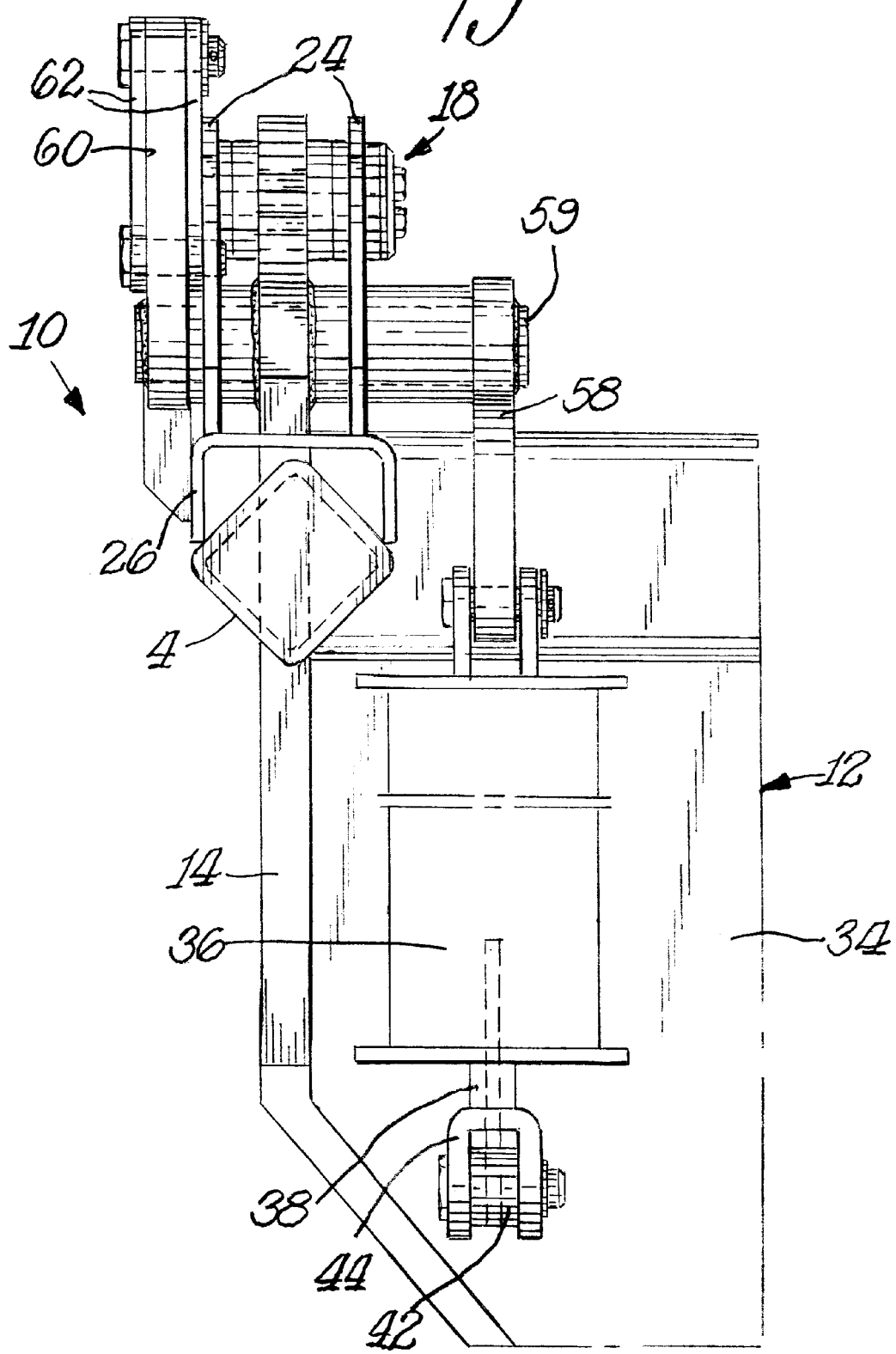
FIG. 4 is a rear elevational view of a portion of the gate assembly of this invention showing the gate assembly in the closed position of FIG. 2.

FIGS. 2–4 illustrate the details of top hinged gate assembly 10. As shown in FIG. 4 the gate assembly 10 includes a gate 12 which would be of any conventional structure known for closing the discharge opening of a dump body. In general, the gate 12 may be considered of plate like solid construction which is preferably imperforate so that the contents of the dump body 1 will not fall from the discharge opening when gate 12 is in its closed generally vertical position shown in solid in FIG. 1.

As shown in FIGS. 2 and 4 a hinge arm 14 is attached to a side of gate 12. Preferably, a similar hinge arm would be attached to the opposite side of gate 12 so that there is a hinge arm on each side. Thus, the reinforced end dump body top hinge gate 12 has a hinge structure at each of its sides. As best shown in FIGS. 2 and 3 hinge arm 14 includes a generally offset extension portion 16 which in the closed position extends over the top of dump body 1. The free end of offset portion 16 is pivotally mounted to a first pivot structure 18. Pivot structure 18 may include a shaft 20 mounted in a bearing 22. The shaft is mounted across a pair of mounting plates 24,24 as best shown in FIG. 4. The first pivot structure 18 is located above and forward of the gate 12 and the bearings on each side of the gate align on a common rotation axis parallel to a horizontal plane through the gate face. The gate hinge arm 14 and its offset portion 16 and their bearing 22 rotate about the hinge pin or shaft 20 in the brackets 24,24 attached to the top of the dump body 1 on each side of the dump body. The brackets 24,24 are each connected to a U-shaped channel 26 which fits over the top rail 4 of the dump body.

As illustrated a second hinge arm 28 which may be considered as a gravity release lever is also pivotally mounted on the same common axis to shaft 20. The gravity release lever 28 is free to rotate on the common hinge axis but is stopped from rotating beyond a limit position by a stop block 30.

A variable length power actuator 40 is mounted to gate 12 as illustrated in FIGS. 2–4. Any suitable variable length power actuator may be used in accordance with this invention. The illustrated embodiment shows a piston cylinder assembly which includes a cylinder 36 and piston 38. The piston cylinder assembly may be powered by air, hydraulic or electric power. Other forms of variable length power actuators include, for example, a pair of sliding plates which may be engaged by any suitable structure such as a rack and pinion gear structure wherein one of the plates would electrically driven for movement with respect to the other plate. An air cylinder is the preferred form of variable length power actuator.

As shown in FIG. 2 variable length power actuator 40 is mounted to gate 12 by a support bracket 42 which extends outwardly from the front face 34 of gate 12. The piston 38 is pivotally mounted to support bracket 42 in any suitable manner such as by a U-shaped connector 44 having a clevis pin 46. A further U-shaped connector 48 is secured to cylinder 36 which in turn is pivotally secured by a clevis pin 50 to a linkage assembly 52 as later described.

A second pivot structure 54 is mounted to gravity release lever 28 at a location spaced from first pivot structure 18. Second pivot structure 54 is also located above and forwardly of gate 12. Second pivot structure 54 could be of any suitable form which could include, for example, a pivot pin 56. The linkage assembly 52 is pivotally mounted to second pivot structure 54 so as to thereby pivotally connect the actuator 40 to gravity release lever 28.

The linkage assembly 52 preferably includes a crank arm 58 pivotally mounted on pivot pin 50. A connecting arm 60 is rigidly secured to crank arm 58 at one end of connecting arm 60 by arms 58 and 60 being rigidly mounted to shaft 59.

The opposite end of connecting arm 60 is secured to link arm 62 by a pivotal connection 64 such as a clevis pin. If desired actuator 40 could be mounted directly to second pivot structure 54 without the intermediate linkage assembly 52.

When actuator 40 is powered to change its length so as to extend piston rod 38 from cylinder 36 there is a force between the gate 12 and the gravity release lever 28. When the lever 28 hits the stop 30 the gate 12 is forced to rotate open about the hinge structures. The power actuator 40, the gravity release lever 28 and the indirect linkage assembly 52, where used, are sized and the geometry is determined to power rotate the gate 12 until the gate face is approximately parallel to the dump floor body 3. As shown in phantom in FIG. 1 and as shown in FIG. 3 when in this position the rotation of the gate 12 stops. The gate 12, however, is still free to rotate beyond the power open position by application of an external force. Thus, if the gate is dragged forward or sideways against a tall discharge pile, the gate is free to rotate to a greater angle than the generally perpendicular angle illustrated herein and the gate will ride over the pile or object. When the gate is moved beyond the discharge pile the gate will return to the maximum power lift position illustrated in FIG. 3. This results from the gravity release lever 28 acting as a floating arm which permits the gate to rotate to its power open position and then beyond that position and then again to return to that power open position. When the power is removed from the variable length power actuator 40 the weight of the gate will force the power lift mechanism backwards and the gate will drop to its free gravity position. When the dump body 1 is lowered to its horizontal position the gate 12 by virtue of the forward hinge pin location closes tightly against the body where it can be locked closed by a conventional gate latch.

Where the variable length actuator is an air cylinder the hose for the cylinder may extend over the gate to the power source mounted on the dump body. The gate may also include conventional mud flaps 66 extending from the lower portion of the gate as shown in FIG. 1.

The present invention may thus be considered as being a floating top hinged, power self-opening, gate assembly for a dump body. Such assembly 10 would cover the discharge opening 2 of the dump body 1 that incorporates a frame to provide structural reinforcement for resisting the forces of power actuators through the power opening cycle. A pair of hinge assemblies is located above and forward of the gate with hinge arms 14 that connect each side of the gate to a common hinge pin axis. A pair of gate mounted power actuators 40 provides adequate force through a distance to cause the weight of the gate to be rotated open to a desired position about the hinge pin axis. A pair of floating arms or gravity release levers 28 are hinged to the same gate hinge pin axis as the hinge arms 14 and are free to rotate independently of the hinge arms 14 but are stopped from rotating in the direction of gate closing beyond a specific point due to the provision of stop blocks 30. A pair of linkage assemblies 52 connect the power actuators 40 to the pair of floating arms 28 and provide the geometry required to direct the power actuator force to effectively rotate the gate 12 to the desired position. The invention could be practiced with a single power actuator to power both of the linkage assemblies through a common cross shaft. Such single power actuator could also power a single linkage assembly through a single floating arm or gravity release lever. The invention could also be practiced with a pair of trunnion mounted power actuators which power the gate 12 to rotate open by direct force to the rotating arms rather than through linkage.

The gate assembly 10 thus provides a power opening gate device that is not limited in lift capacity by space for the required components. The gate assembly includes a power opening gate device that does not interfere with the dump body width and does not interfere with current body cover systems required by state regulation. The power opening gate device does not restrict the gate hinge pin location and can power open any top hinge gate regardless of size or weight. In addition, the gate assembly can operate with one or more actuators with no restriction in size. Further the power opening gate device does not interfere with the dump body frame, is not vulnerable to loading damage and does not require guards.

What is claimed is:

1. A top hinged gate assembly for selectively opening and closing a discharge opening of a dump body, comprising a gate for closing the discharge opening of the dump body when said gate is in a generally vertical position, at least one hinge arm mounted to said gate, a first pivot structure located above and forward of said gate, said hinge arm being pivotally mounted to said first pivot structure, a gravity release lever pivotally mounted to said first pivot structure, a variable length power actuator mounted to said gate, a second pivot structure displaced from said first pivot structure, said second pivot structure being mounted to said gravity release lever, said actuator being pivotally mounted to said second pivot structure, an increase in the length of said actuator causing said gate to rotate from a closed position to an open position which is generally perpendicular to said closed position to be generally parallel to the body floor, and said gravity release lever permitting said gate to rotate beyond said open position in response to an object contacting said gate.

2. The assembly of claim 1 including a linkage assembly connected to said actuator and pivotally mounted to said second pivot structure whereby said actuator is thereby mounted to said second pivot structure.

3. The assembly of claim 2 wherein said variable length power actuator is a piston and cylinder assembly.

4. The assembly of claim 3 wherein one of said hinge arms is mounted to each of the opposite sides of said gate, and each of said hinge arms being pivotally connected to a separate first pivot structure to which a separate gravity release lever is pivoted.

5. The assembly of claim 4 wherein each said opposite side of said gate includes a separate variable length power actuator.

6. The assembly of claim 4 wherein said assembly includes a single variable length power actuator for both sets of said hinge arms and said gravity release levers.

7. The assembly of claim 3 wherein said linkage assembly includes a crank arm pivotally connected to said variable length power actuator, and a link arm mounted to said crank arm and pivotally connected to said second pivot structure.

8. The assembly of claim 7 including a connecting arm rigidly connected to said crank arm and pivotally connected to said link arm.

9. The assembly of claim 8 wherein said hinge arm includes an offset portion pivotally mounted to said first pivot structure.

10. The assembly of claim 9 including a stop block in the path of motion of said gravity release lever for preventing clockwise rotation of said gravity release lever when said gravity release lever contacts said stop block.

11. The assembly of claim 2 wherein said linkage assembly includes a crank arm pivotally connected to said variable length power actuator, and a link arm mounted to said crank arm and pivotally connected to said second pivot structure.

12. The assembly of claim 1 wherein one of said hinge arms is mounted to each of the opposite sides of said gate and each of said hinge arms is pivotally connected to a separate first pivot structure to which a separate gravity release lever is pivoted.

13. The assembly of claim 12 wherein each said opposite side of said gate includes a separate variable length power actuator.

14. The assembly of claim 12 wherein said assembly includes a single variable length power actuator for both sets of said hinge arms and said gravity release levers.

15. The assembly of claim 1 including a stop block in the path of motion of said gravity release lever for preventing clockwise rotation of said gravity release lever when said gravity release lever contacts said stop block.

16. The assembly of claim 1 in combination with the dump body, said dump body having the discharge opening and a top wall, said assembly being mounted to said top wall at said discharge opening.

17. The combination of claim 16 wherein said dump body is mounted on a vehicle, and including elevating structure for elevating the front end of said dump body whereby said front end of said dump body is higher than the elevation of said discharge opening.

* * * * *